United States Patent
Hsieh

(10) Patent No.: US 9,089,975 B2
(45) Date of Patent: Jul. 28, 2015

(54) ROBOTIC ARM

(71) Applicant: HIWIN TECHNOLOGIES CORP., Taichung (TW)

(72) Inventor: Wu-Teng Hsieh, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 94 days.

(21) Appl. No.: 13/955,895

(22) Filed: Jul. 31, 2013

(65) Prior Publication Data
US 2015/0033898 A1   Feb. 5, 2015

(51) Int. Cl.
*B25J 17/02* (2006.01)

(52) U.S. Cl.
CPC ............ *B25J 17/02* (2013.01); *B25J 17/025* (2013.01); *Y10S 901/29* (2013.01)

(58) Field of Classification Search
CPC ...... B25J 9/0036; B25J 9/101; B25J 17/0208; B25J 17/0266; B25J 17/0283; B25J 17/0291; B25J 17/0225; B25J 17/025; B25J 17/0258; Y10S 901/23; Y10S 901/29; Y10S 901/22
USPC .............. 74/490.01, 490.03, 490.05, 490.06; 82/124–127; 414/744.5, 744.7; 901/14, 901/16, 27–29
See application file for complete search history.

(56) References Cited

U.S. PATENT DOCUMENTS

| | | | |
|---|---|---|---|
| 4,458,566 A * | 7/1984 | Tajima ......................... | 82/124 |
| 5,207,554 A * | 5/1993 | Asakawa et al. ........... | 414/744.6 |
| 6,285,152 B1 * | 9/2001 | Ookura et al. ............ | 318/568.11 |
| 7,959,386 B2 * | 6/2011 | Hara et al. ..................... | 409/134 |
| 8,181,321 B2 * | 5/2012 | Tullmann ..................... | 29/27 C |
| 8,240,971 B2 * | 8/2012 | Sandmeier ................. | 414/744.5 |
| 2010/0331857 A1 * | 12/2010 | Doyle et al. ................. | 606/130 |
| 2011/0288677 A1 * | 11/2011 | Meidar et al. ................. | 700/193 |

FOREIGN PATENT DOCUMENTS

JP    H11-77566    3/1999

* cited by examiner

*Primary Examiner* — William Kelleher
*Assistant Examiner* — Thomas Magnuson
(74) *Attorney, Agent, or Firm* — Muncy, Geissler, Olds & Lowe, P.C.

(57) ABSTRACT

In order to reduce the cost of robotic arm, the invention provides a robotic arm, which includes an arm member having a first pivot connection portion, a locating member affixed to the arm member, a sliding member movably mounted at the locating member, a stop member affixed to the sliding member, a wrist member having a second pivot connection portion pivoted to the sliding member and a third pivot connection portion movable relative to the second pivot connection portion, and a driving device including a body member pivoted to the first pivot connection portion and an extension member pivoted to the third pivot connection portion of the wrist member and movable relative to the body member. Using the locating member, the sliding member, the stop member and the wrist member to match with the driving device, the robotic arm achieves the effect of moving and swinging and cost reduction.

6 Claims, 7 Drawing Sheets

ROBOTIC ARM

BACKGROUND OF THE INVENTION

1. Field of the Invention

The present invention relates to robots, and more particularly to a robotic arm.

2. Description of the Related Art

With the advances in robotic technology, unmanned factory is no longer a distant dream. In robotic technology, especially robotic arms have long been used in many automated factories. For example, Japanese Patent 11-77566 discloses a robotic arm for use in a LCD manufacturing factory to deliver glass substrates. The end-piece of the robotic arm is able to make lifting, swinging and turning-around actions to facilitate gripping a glass substrate. However, in order to make complicated actions, the robotic arm needs to use multiple servomotors, resulting in a high robotic arm manufacturing cost and the indisputable fact that it is really not conducive to using a large amount of robotic arms in a factory. Further, due to the problem of high cost, in some situations where only simple moving and swinging operations, such as processing machine loading and unloading operations are needed, it is not economic to use the aforesaid robotic arm.

In order to solve the problem of high cost in using the aforesaid prior art robotic arm for simple operational applications, it is necessary to design a robotic arm that uses a less number of servomotors, making the robotic arm to satisfy the needs for performance of simple moving and swinging operations.

SUMMARY OF THE INVENTION

The present invention has been accomplished under the circumstances in view. It is the main object of the present invention to provide a robotic arm, which reduces the number of servomotors to achieve cost reduction and can achieve optimal moving and swinging operations.

To achieve these and other objects of the present invention, a robotic arm of the present invention comprises an arm member comprising a first pivot connection portion, a locating member fixedly connected to one end of the arm member, a sliding member movably mounted at the locating member, a stop member fixedly connected to the sliding member to stop the sliding member from escaping out of the locating member, a connector fixedly connected to the sliding member, a wrist member comprising a second pivot connection portion that is pivotally connected to the connector and a third pivot connection portion, and a driving device comprising a body member and an extension member movable relative to each other by an external force. The body member of the driving device is pivotally connected to the first pivot connection portion. The extension member of the driving device is pivotally connected to the third pivot connection portion of the wrist member.

Thus, operating the driving device to let the body member and the extension member be moved relative to each other can cause the wrist member to move and to swing relative to the arm member, achieving the need for a robotic arm having a less number of servomotors.

Other advantages and features of the present invention will be fully understood by reference to the following specification in conjunction with the accompanying drawings, in which like reference signs denote like components of structure.

DETAILED DESCRIPTION OF THE INVENTION

Figure 1:
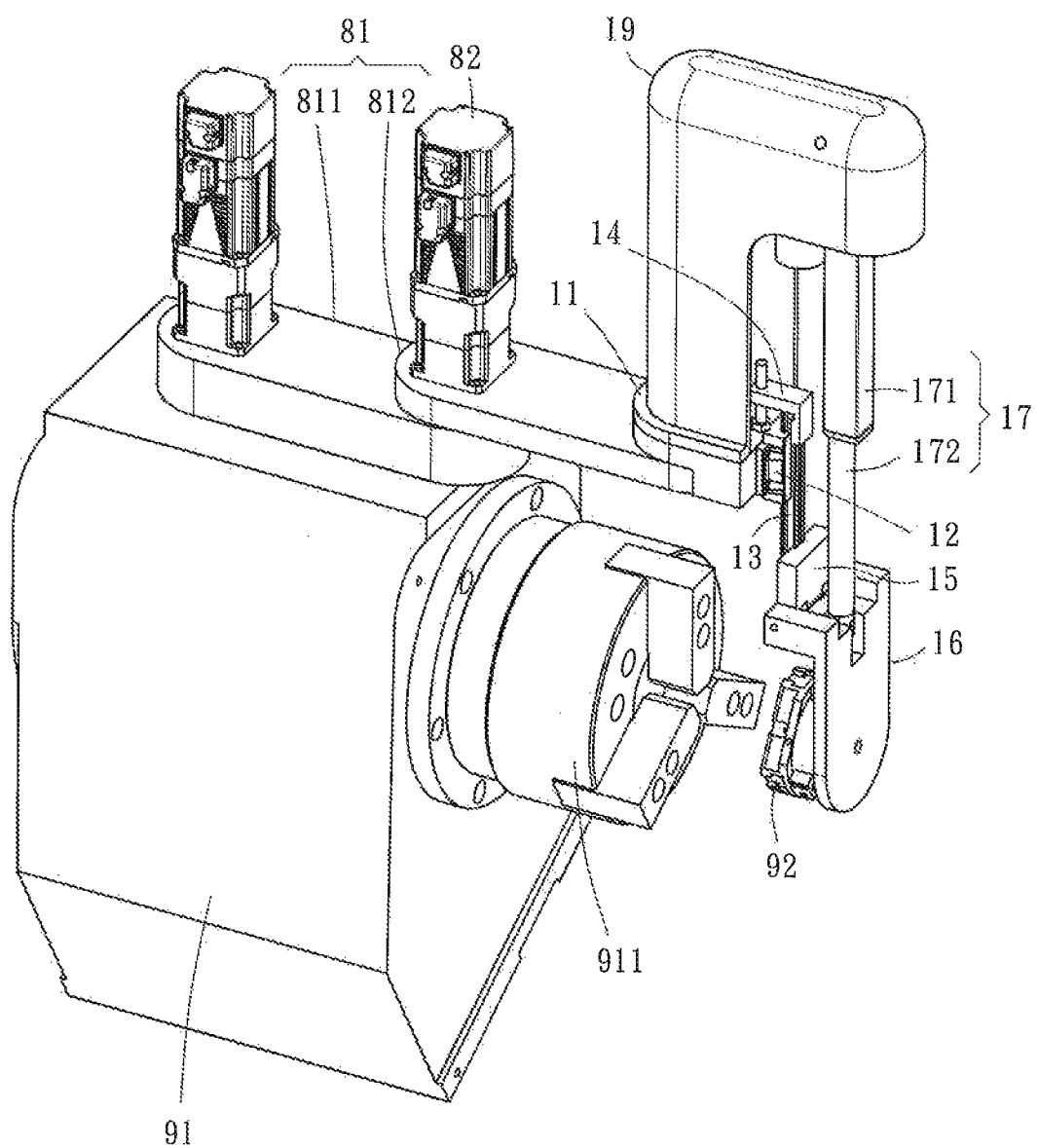
FIG. 1 is an oblique top elevational view of a robotic arm in accordance with the present invention.
Figure 2:
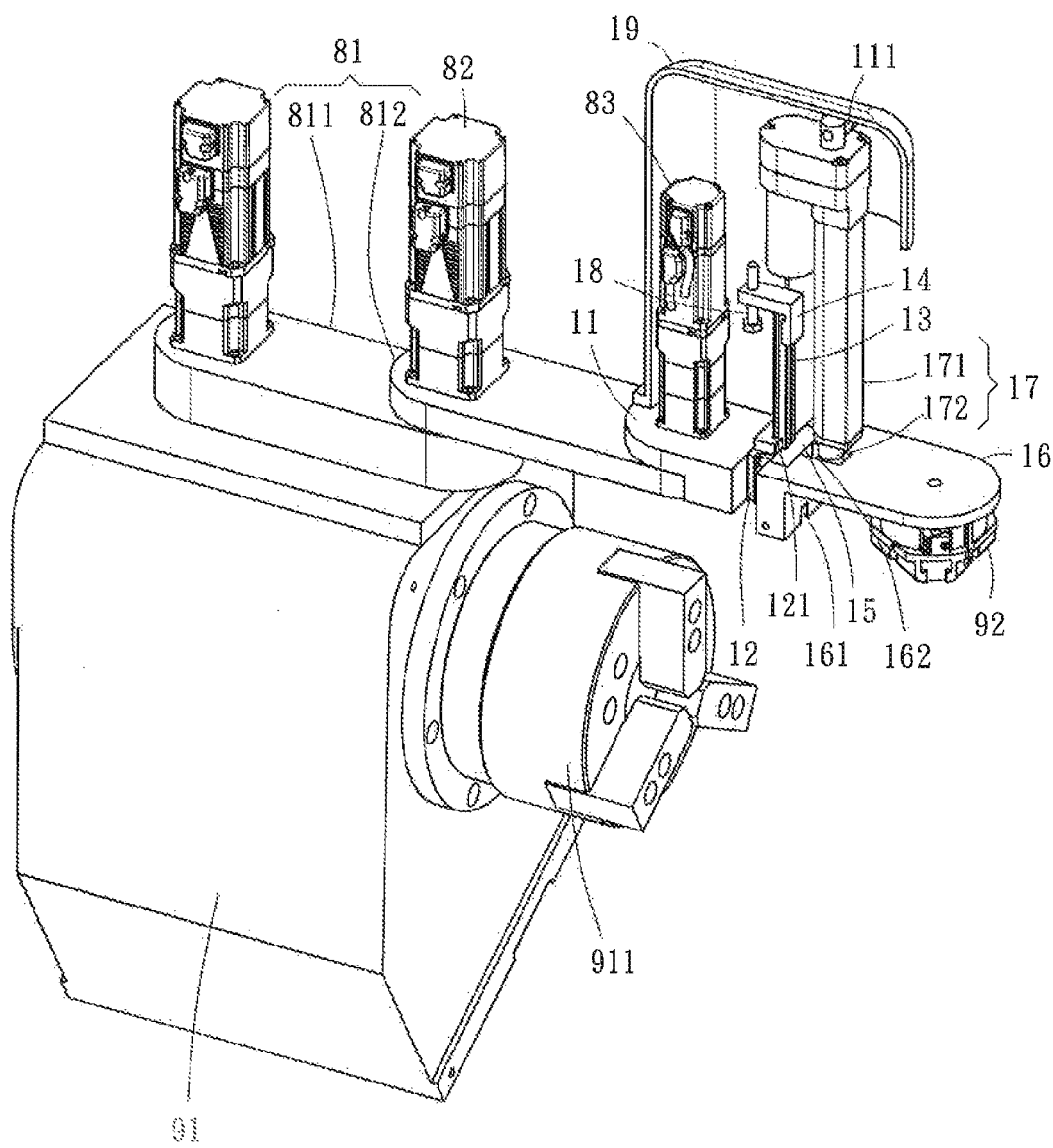
FIG. 2 is a partially sectional elevational view of the robotic arm in accordance with the present invention.
Figure 3:
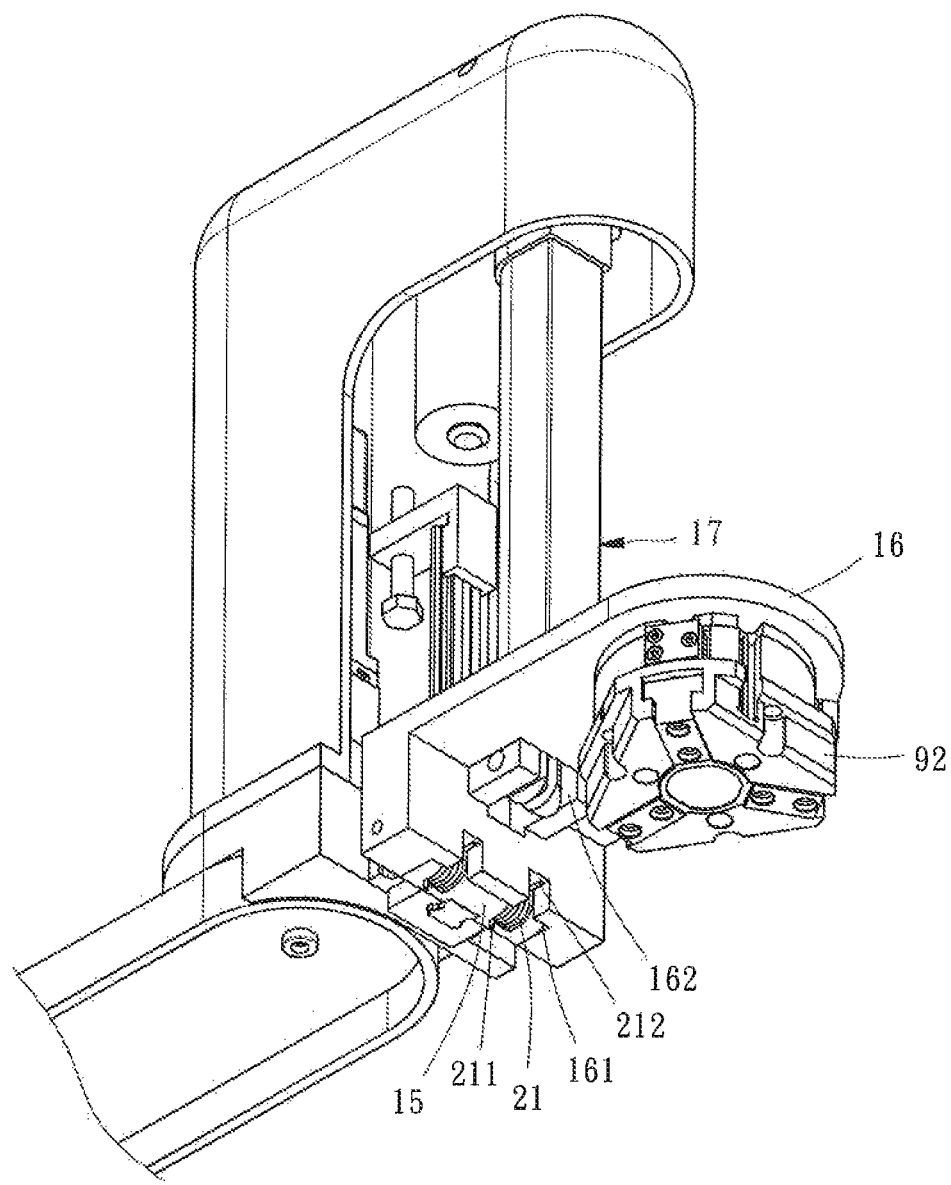
FIG. 3 is an oblique bottom elevational view of the robotic arm in accordance with the present invention.

Referring to FIGS. 1-3, a robotic arm in accordance with the present invention is shown. The robotic arm comprises an arm member 11, a locating member 12, a sliding member 13, a stop member 14, a connector 15, a wrist member 16, and a driving device 17.

It is to be understood that, for easy understanding of the operation of the present invention, the invention is shown installed in a movable arm 81 is formed of pivotally connected first arm segment 811 and second arm segment 812, wherein the first arm segment 811 is pivotally connected to a processing machine 91 and swingable relative to the processing machine 91. It also should be noted that the application of the present invention is not limited to installation in the movable arm 81; the invention can also be directly mounted in a machine tool or object.

The arm member 11 is pivotally connected to the second arm segment 812 of the movable arm 81, comprising a first pivot connection portion 111 for the connection of an object pivotally. In this embodiment, a first servomotor 82 is adapted for driving the first arm segment 811 and the second arm segment 812 to swing relative to each other, and a second servomotor 83 is adapted for driving the second arm segment 812 and the arm member 11 to swing relative to each other.

The locating member 12 is affixed to one end of the arm member 11. Further, the locating member 12 defines a guiding groove 121.

The sliding member 13 is movably mounted in the guiding groove 121 of the locating member 12, and constrained by the guiding groove 121 to move relative to the locating member 12.

The stop member 14 is fixedly mounted at the sliding member 13, and adapted to limit the sliding range of the sliding member 13 relative to the locating member 12. In this embodiment, the stop member 14 is fixedly mounted at the top side of the sliding member 13, allowing the sliding member 13 to be moved downwardly relative to the locating member 12 and finally stopped by the stop member 14 from further downward movement. It is worth mentioning that, in this embodiment, an adjustment screw 18 is mounted in the stop member 14; rotating the adjustment screw 18 to adjust the relative position between the adjustment screw 18 and the stop member 14 can adjust the downward displacement amount of the sliding member 13 relative to the locating member 12.

The connector 15 is fixedly connected to the sliding member 13 without interfering with the locating member 12 to stop the sliding member 13 from downward movement.

The wrist member 16 comprises a second pivot connection portion 161 and a third pivot connection portion 162. The second pivot connection portion 161 is pivotally connected to the connector 15, allowing the wrist member 16 to swing relative to the connector 15.

It is to be noted that the wrist member 16 is mounted at the connector 15 in this embodiment; actually, the second pivot connection portion 161 of the wrist member 16 can be directly and pivotally connected to the sliding member 13 instead of the method of mounting the wrist member 16 at the connector 15.

Further, the driving device 17 in this embodiment is a linear actuator, comprising a body member 171 that is movable by an external force, and an extension member 172. The body member 171 is pivotally connected to the first pivot connection portion 111. The extension member 172 is pivotally connected to the third pivot connection portion 162 of the wrist member 16. When the body member 171 and the extension member 172 are moved part, the wrist member 16 is pushed away from the arm member 11 to move downwards.

It is worth mentioning that in this embodiment, the arm member 11 is fixedly provided with a guard member 19. The first pivot connection portion 111 formed on the inner side of the guard member 19. The guard member 19 shields the driving device 17, the locating member 12 and the sliding member 13, reducing the risk of falling of dust or external matters on them.

Further, in order to reduce the load of the driving device 17 in biasing the wrist member 16 upwardly relative to the connector 15, a torsion spring 21 is mounted between the connector 15 and the wrist member 16. The torsion spring 21 has a first end 211 and a second end 212. The first end 211 is stopped against the connector 15. The second end 212 is stopped against the wrist member 16. Because the torque or rotary force exerted by the torsion spring 21 assists the wrist member 16 to bias upwards, thereby reducing the load of the driving device 17.

Figure 4:
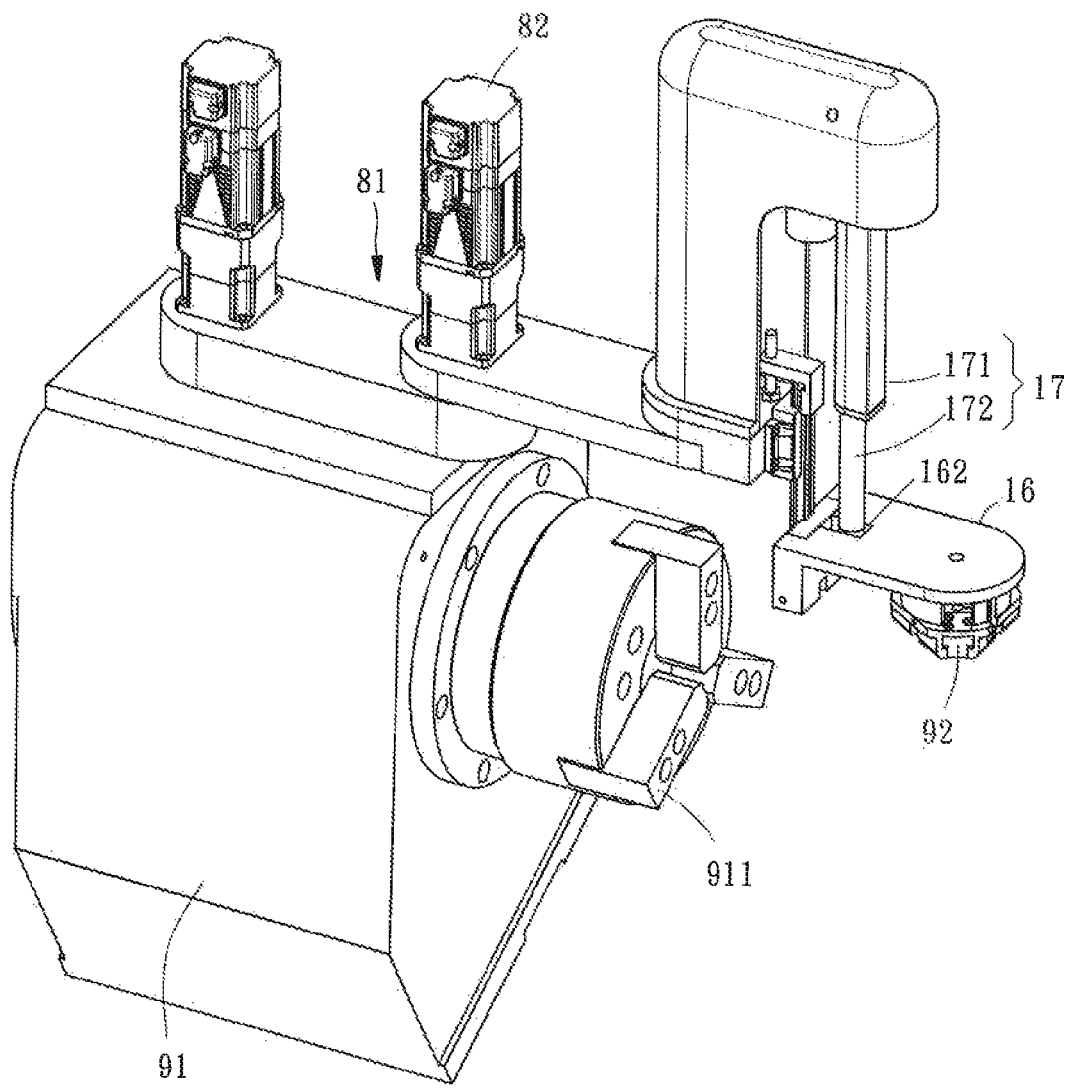
FIG. 4 is a schematic drawing illustrating a status of use of the robotic arm in accordance with the present invention (I).
Figure 5:
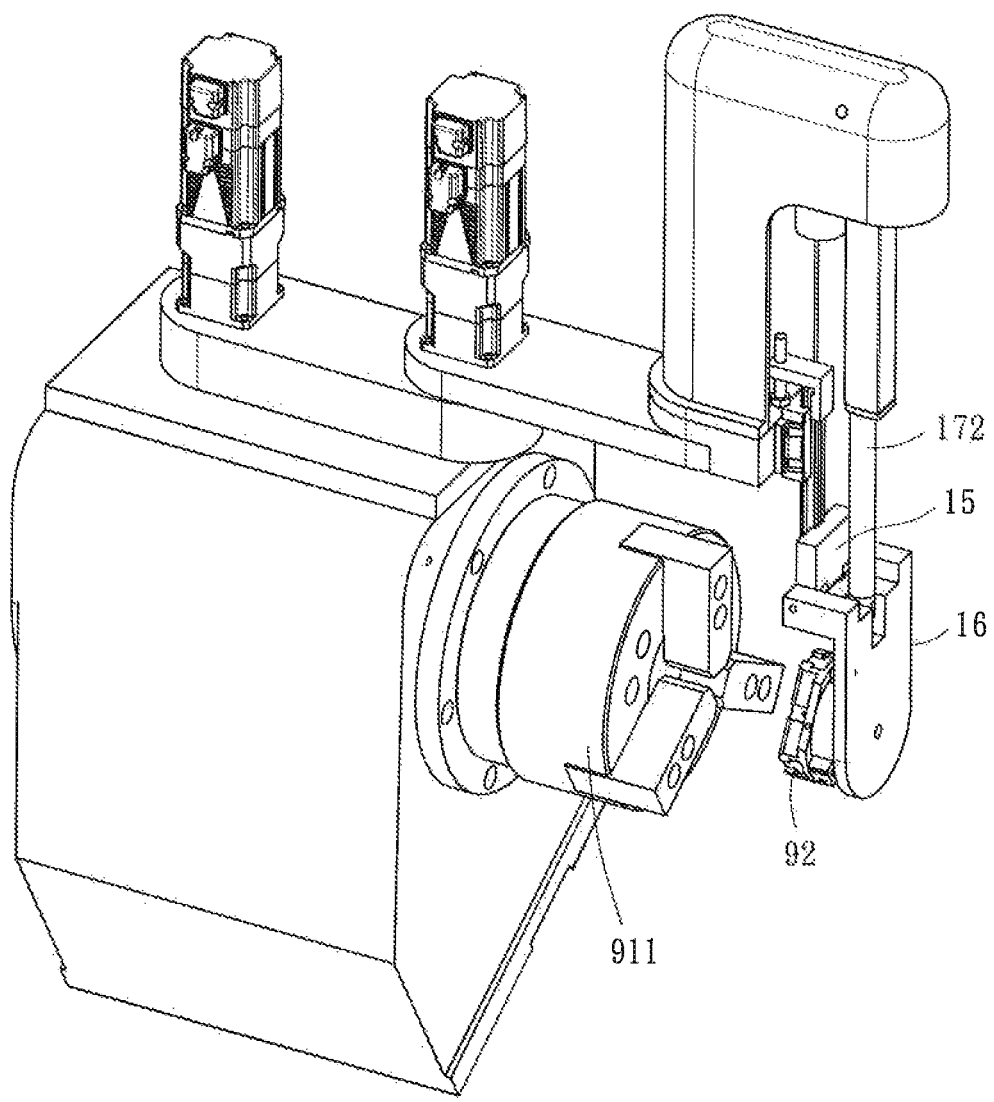
FIG. 5 is a schematic drawing illustrating a status of use of the robotic arm in accordance with the present invention (II).
Figure 6:
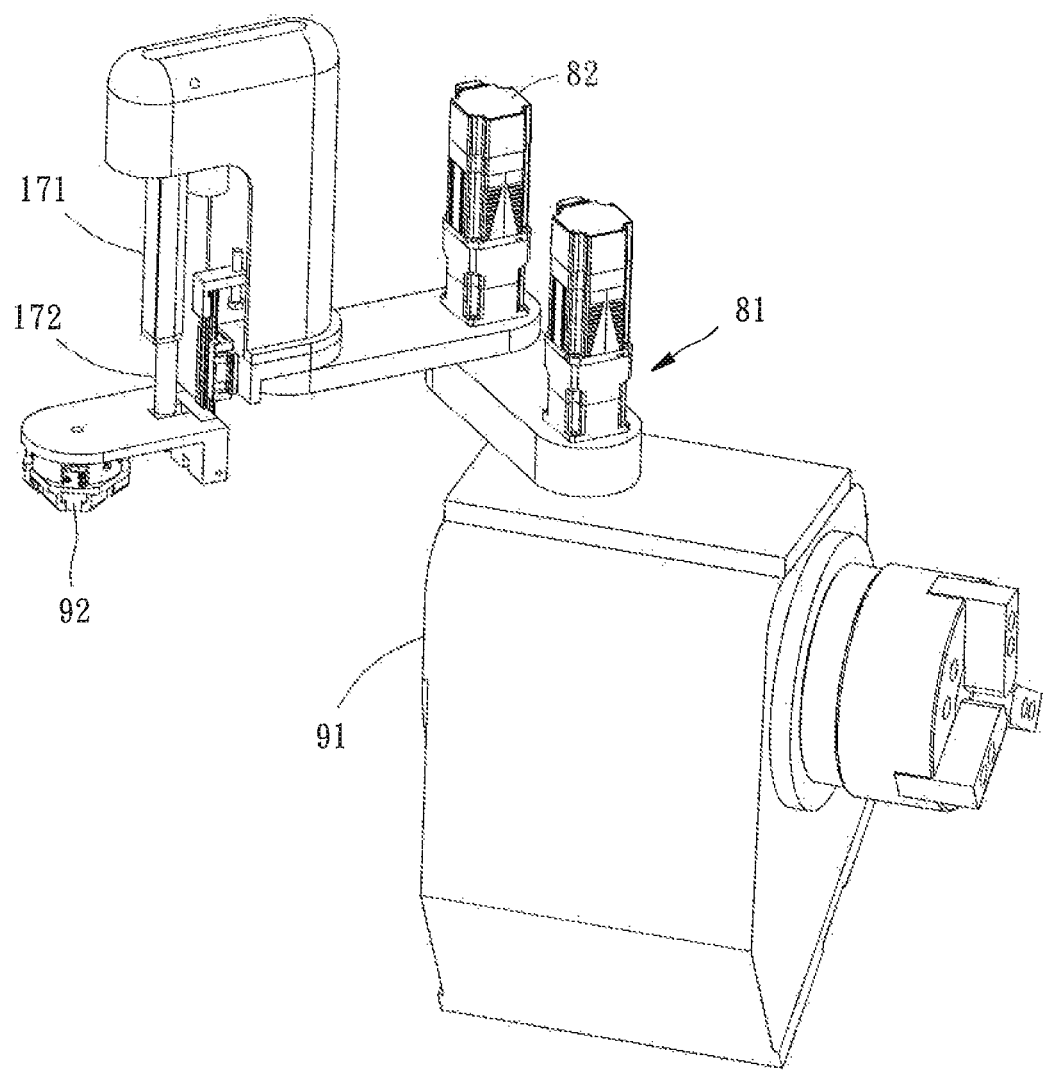
FIG. 6 is a schematic drawing illustrating a status of use of the robotic arm in accordance with the present invention (III).

After description of the structural features of the present invention as stated above, the operation of the present invention is outlined hereinafter. FIGS. 4-6 illustrate the operation of the present invention. In this embodiment, a pick-up device 92 is provided at the bottom side of the wrist member 16 of the robotic arm.

As shown in FIG. 4, by means of the processing machine 91, the first servomotor 82 and the second servomotor 83, the movable arm 81 moves the robotic arm of the present invention to a front upper position relative to the processing machine 91 where the chuck 911 of the processing machine 91 is disposed below the elevation of the robotic arm. Thereafter, the body member 171 and extension member 172 of the driving device 17 are moved relative to each other, causing the extension member 172 to move the third pivot connection portion 162 in lowering the wrist member 16.

As shown in FIG. 5, the extension member 172 keeps moving the wrist member 16 downwards till that the adjustment screw 18 is stopped against the arm member 11 (if the adjustment screw 18 is not used, the stop member 14 will be stopped against the arm member 11) to prohibit the wrist member 16 from further downward movement. At this time, the second pivot connection portion 161 is spaced from the third pivot connection portion 162 at a distance, enabling the wrist member 16 to be biased relative to the connector 15, and thus the pick-up device 92 can be operated to pick up the workpiece (not shown) from the chuck 911 of the processing machine 91.

As shown in FIG. 6, after the pick-up device 92 picked up the workpiece, the extension member 172 of the driving device 17 is moved upwards to move the wrist member 16 again. Thereafter, the processing machine 91 and the first servomotor 82 are driven to move the movable arm 81, enabling the workpiece at the pick-up device 92 to be placed on the selected location.

Based on the above description, it can be known that the robotic arm of the present invention uses the locating member 12, the sliding member 13, the stop member 14, the connector 15 and the wrist member 16 to match with the driving device, achieving the desired moving and swinging operations and virtually eliminating the problem of high cost of the prior art robotic arm that uses multiple servomotors.

Figure 7:
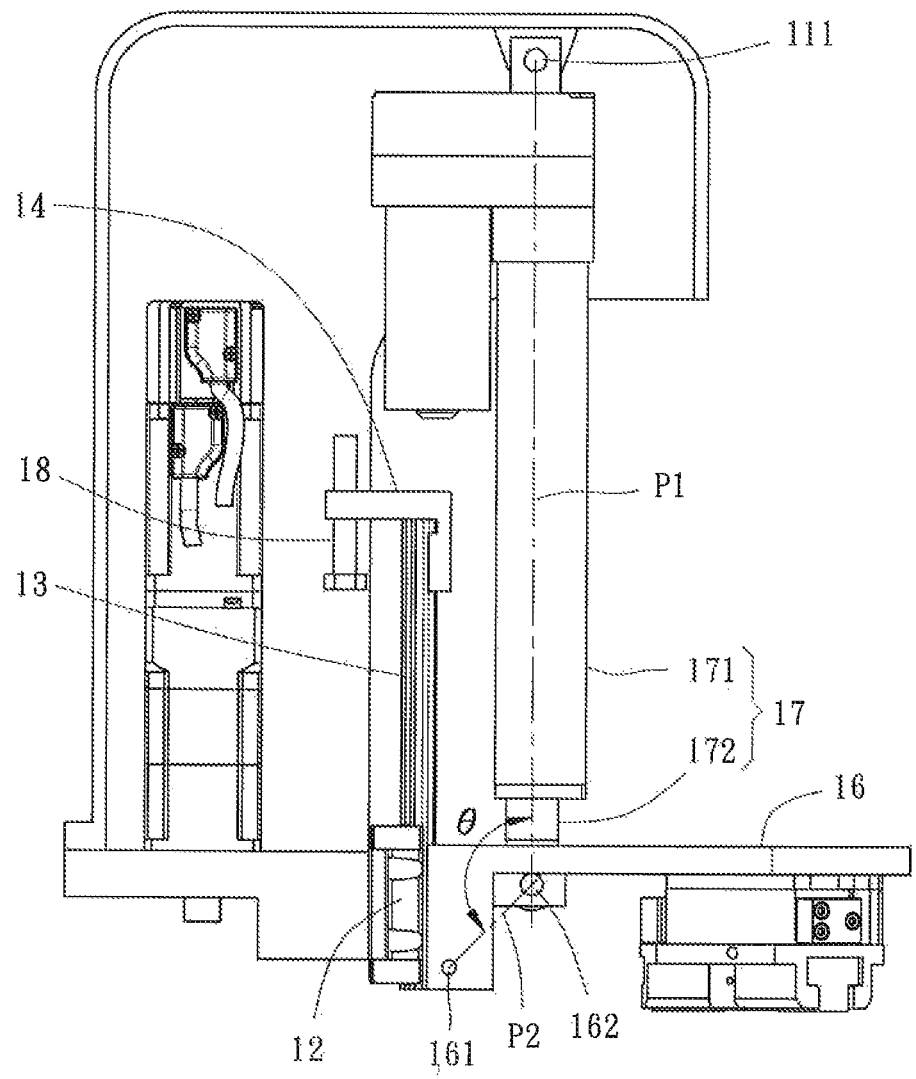
FIG. 7 is a partially sectional side view of the robotic arm in accordance with the present invention.

Further, as shown in FIG. 7, in the present preferred embodiment, a first plane P1 passes through the first pivot connection portion 111 and the third pivot connection portion 162, and a second plane P2 passes through the second pivot connection portion 161 and the third pivot connection portion 162. Considering the smoothness and efficiency of the operation of the driving device 17 in moving the wrist member 16, the contained angle θ defined between the first plane P1 and the second plane P2 is preferably in the range of 135°—90°, or most preferably 105°.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A robotic arm, comprising:
an arm member comprising a first pivot connection portion;
a locating member fixedly connected to one end of said arm member;
a sliding member movably mounted at said locating member;
a stop member fixedly connected to said sliding member and adapted to limit the travel range of said sliding member relative to said sliding member and adapted to limit the travel range of said sliding member relative to said locating member;
a wrist member comprising a second pivot connection portion and a third pivot connection portion, said second pivot connection portion being pivotally connected to said sliding member;
a driving device comprising a body member and an extension member movable relative to each other by an external force, said body member being pivotally connected to said first pivot connection portion, said extension member being pivotally connected to said third pivot connection portion; and
an adjustment screw mounted in said stop member and rotatable to change the relative position between said adjustment screw and said stop member.

2. A robotic arm, comprising:
an arm member comprising a first pivot connection portion;
a locating member fixedly connected to one end of said arm member;
a sliding member movably mounted at said locating member;
a stop member fixedly connected to said sliding member and adapted to limit the travel range of said sliding member relative to said locating member;
a connector fixedly connected to said sliding member and kept apart from said stop member at a predetermined distance;
a wrist member comprising a second pivot connection portion and a third pivot connection portion, said second pivot connection portion being pivotally connected to said connector;

a driving device comprising a body member and an extension member movable relative to each other, said body member being pivotally connected to said first pivot connection portion, said extension member being pivotally connected to said third pivot connection portion; and a torsion spring connected between said connector and said wrist member, said torsion spring having a first end stopped against said connector and a second end stopped against said wrist member.

3. The robotic arm as claimed in claim 1, wherein said arm member is fixedly provided with a guard member at a top side thereof; said first pivot connection portion is formed on an inner side of said guard member.

4. The robotic arm as claimed in claim 1, wherein said driving device is a linear actuator.

5. The robotic arm as claimed in claim 1, wherein a first plane passes through said first pivot connection portion and said third pivot connection portion; a second plane passes through said second pivot connection portion and said third pivot connection portion and defines with said first plane a contained angle in the range of 135°-90°.

6. The robotic arm as claimed in claim 5, wherein the contained angle defined between said first plane and said second plane is 105°.

\* \* \* \* \*